April 13, 1954  F. A. ZAENKERT  2,674,762
CARCASS DEHAIRING DEVICE
Filed June 23, 1950  3 Sheets-Sheet 1

INVENTOR.
FREDERICK A. ZAENKERT
BY
ATTORNEY

April 13, 1954     F. A. ZAENKERT     2,674,762
CARCASS DEHAIRING DEVICE

Filed June 23, 1950     3 Sheets-Sheet 2

INVENTOR.
FREDERICK A. ZAENKERT
BY
ATTORNEY

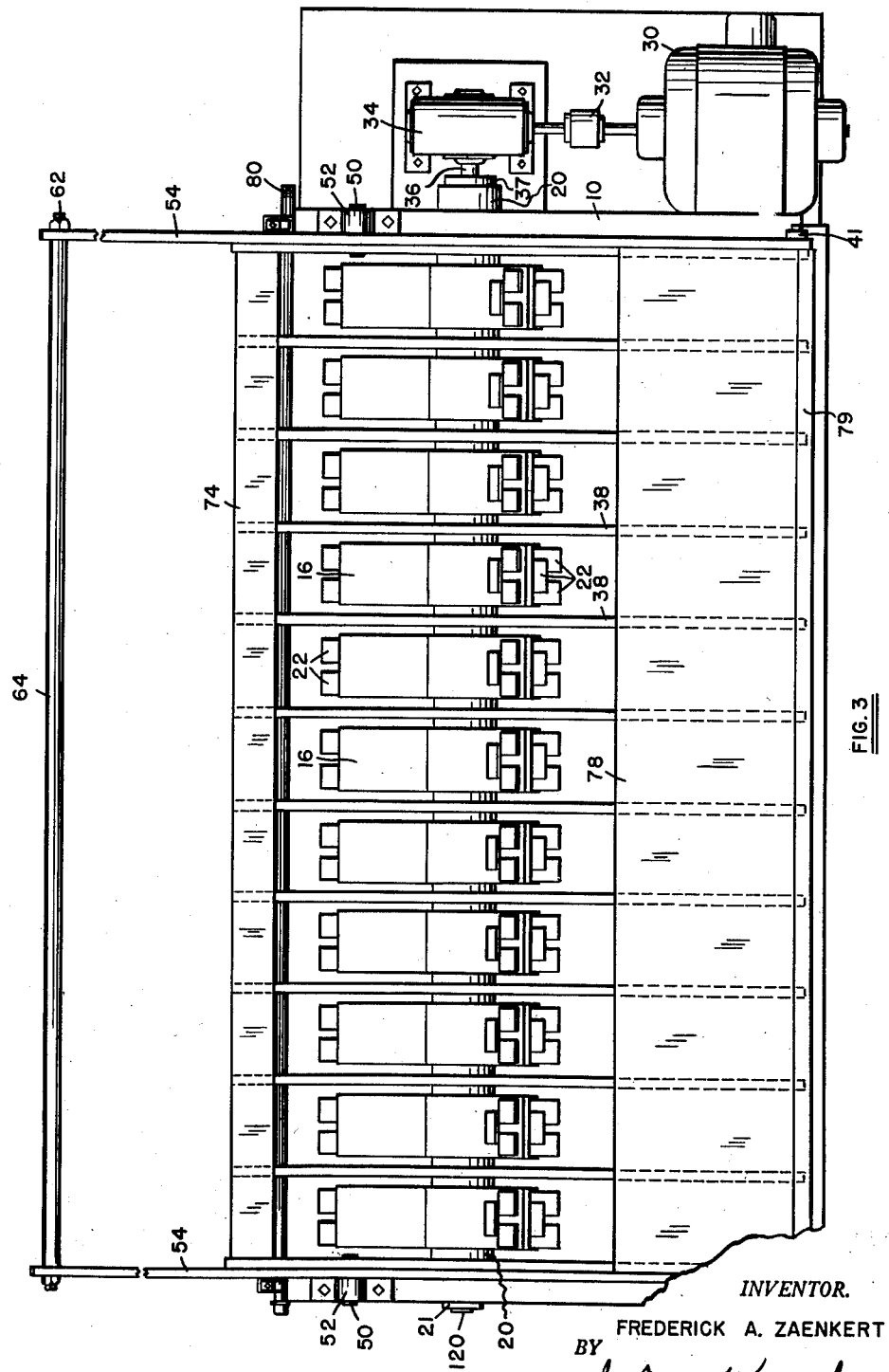

Patented Apr. 13, 1954

2,674,762

UNITED STATES PATENT OFFICE 2,674,762

CARCASS DEHAIRING DEVICE

Frederick A. Zaenkert, Greenhills, Ohio, assignor to The Cincinnati Butchers' Supply Company, Cincinnati, Ohio, a corporation of Ohio Application June 23, 1950, Serial No. 169,912

2 Claims. (Cl. 17—16)

This invention relates to carcass dehairing apparatus.

An object of the invention is to provide a carcass dehairing device which is ideally suited for use in smaller packing establishments wherein the rate of slaughter is on a custom basis, rather than a mass-production basis, said device including a cradle portion which is constructed and arranged to be manually shifted from a lowered dehairing position to a raised gambreling position.

A further object of the invention is to provide a carcass dehairing device the cradle of which is manually shiftable past dead-center to one or the other of two normal positions, whereby to preclude accidental or unintentional movement from one position to another, thereby greatly enhancing the safety characteristics of the device.

Still a further object of the invention is to provide a carcass dehairing device which includes simple, yet highly effective means for preventing the legs of a carcass from extending downwardly through portions of the carcass supporting cradle to positively preclude damage to the legs by the dehairing mechanism.

Another object of the invention is to provide a carcass dehairing device having improved means for securely though removably mounting the scraper shaft of the device for facilitating maintenance thereof.

Still another object of the invention is to provide, in a carcass dehairing device, compact, highly efficient means for removably coupling the scraper shaft to and in driven relationship with a conventional drive mechanism.

Another object of the invention is to provide a dehairing device having the hereinabove described characteristics which is constructed in such a manner as to give many years of efficient, trouble-free service.

These and other objects are attained by the means described herein and as disclosed in the accompanying drawings, in which:

Fig. 3 is a top elevational view of the device of Fig. 1.

Fig. 4 is a fragmental sectional view of the left end of the scraper shaft mounting, which comprises a detail of the invention.

Fig. 5 is a fragmental sectional view of the right end of the scraper shaft mounting which comprises a detail of the invention.

Fig. 6 is an enlarged detail view on line 6—6 of Fig. 5.

Fig. 7 is a vertical sectional view of the mounting or coupling of Fig. 5 when rotated through 90°.

Fig. 8 is a side plan view of a three-arm scraper shaft clamp comprising a detail of the present invention.

Figure 1:
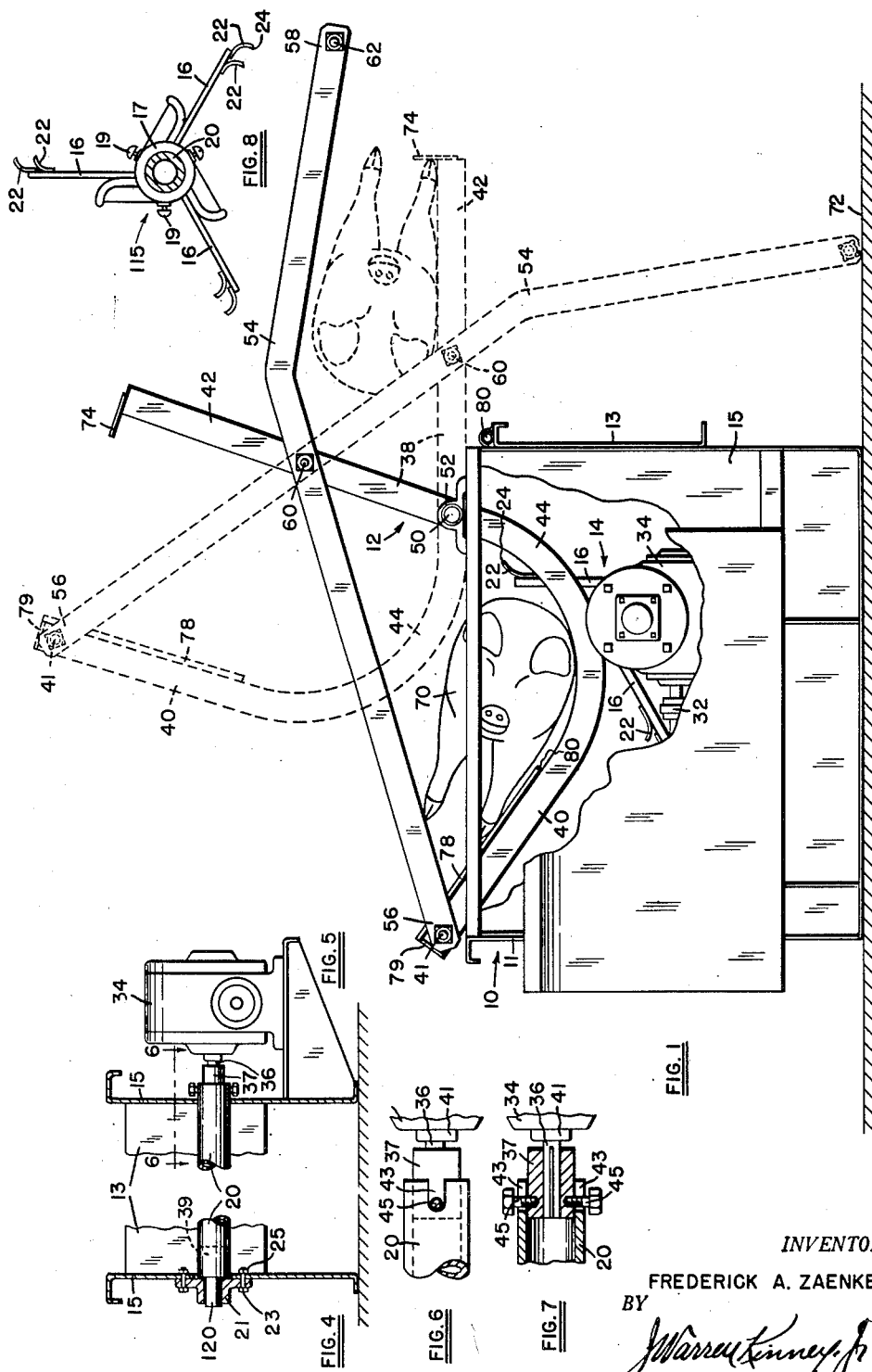
Fig. 1 is a side elevation of a carcass dehairing device embodying the teachings of the present invention, wherein the carcass supporting cradle is illustrated in each of its two normal positions.

The present carcass dehairing device comprises, broadly speaking, a support member 10, including front, rear and end walls 11, 13 and 15, respectively, a carcass supporting cradle denoted generally by the numeral 12 and a rotary dehairing unit denoted generally by the numeral 14.

The rotary dehairing unit comprises a plurality of laterally spaced sets of dehairing members, each set comprising a plurality of arms 16 detachably secured in driven relationship to scraper shaft 20 as by means of a clamp 115, see Fig. 8, the hub 17 of which receives shaft 20 to which it is securely, though releasably, anchored by means of set screws 19. The outer portions of each of arms 16 are provided with flexible resilient scraper means 22 provided with carcass scraping edges 24, Figs. 1, 2 and 8.

Figure 2:
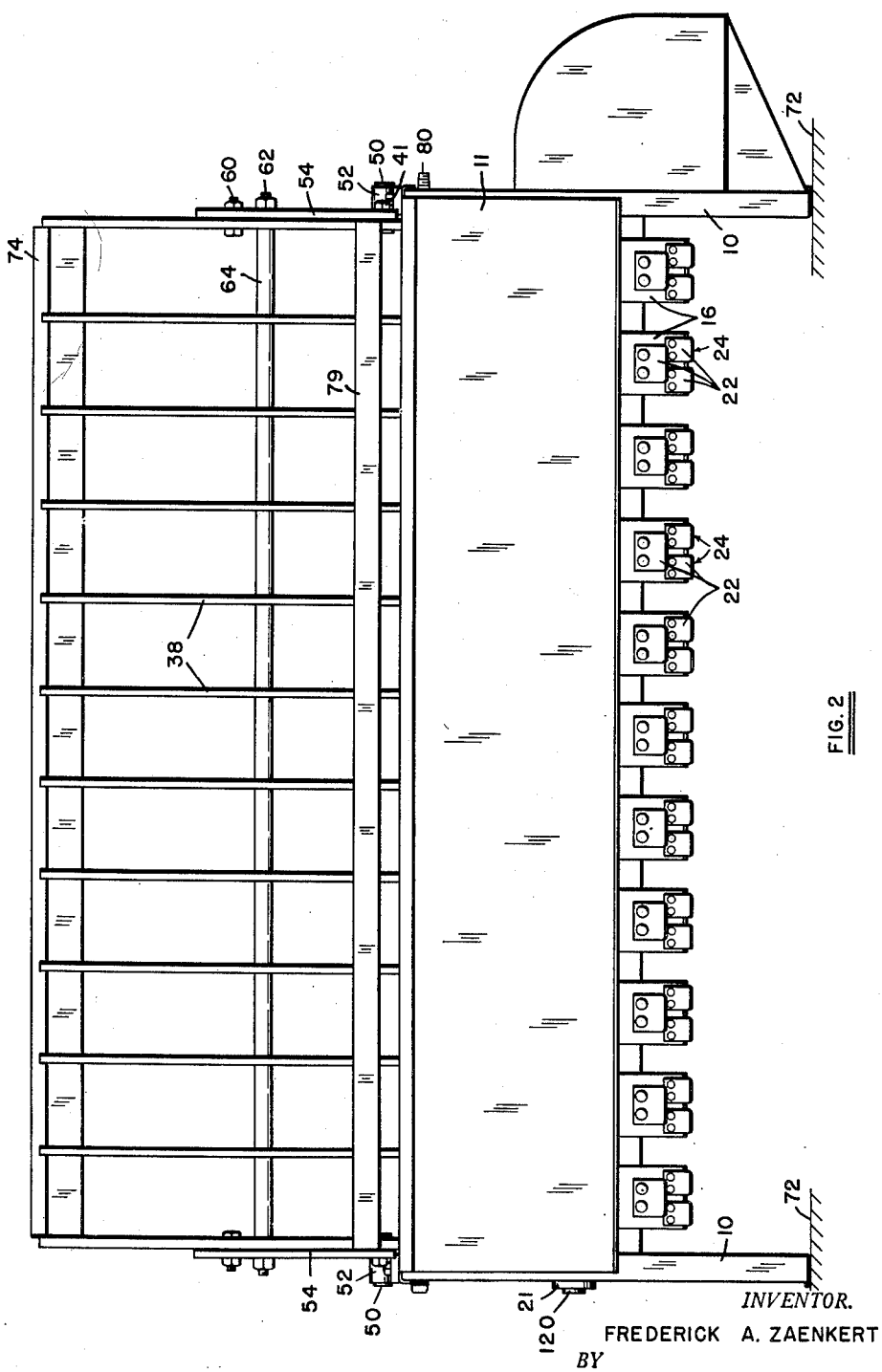
Fig. 2 is a front elevational view of the device of Fig. 1.

As clearly illustrated in Fig. 1, the outer ends of arms 16 of each set of dehairing members will describe an annular path of travel incident to rotation of shaft 20. Rotary motion may be imparted to shaft 20 by means of an electric motor 30 coupled as at 32 to a suitable speed reducing mechanism denoted generally by the numeral 34 from which driven shaft 36 projects, said shaft being suitably secured in driving relationship to shaft 20. The rotary dehairing device illustrated is merely exemplary, it being understood that the invention is neither limited by nor directed to the particular structural details of said device.

In the preferred embodiment of the invention the scraper shaft 20 is mounted between end walls 15 and with reference to shaft 36 of the drive mechanism in such a manner as to facilitate its ease of installation and removal.

With particular reference to Figs. 5, 6 and 7, it will be noted that shaft 36 may be provided with a coupling hub 37 in driven relationship therewith. The outer end of shaft 20 is dimensioned to form a coupling sleeve into which hub 37 is receivable for disposing that end of the scraper shaft in axial alignment with and supported by driven shaft 36. In this manner I utilize bearing 41 of the speed reducer mechanism 34 as the bearing for the right end of shaft 20, thereby eliminating the necessity for an indendent shaft bearing.

The end of shaft 20 may be provided with slotted portions 43 in which drive members, such as bolts 45 secured to and carried by coupling hub 37, are receivable for transmitting the torque of shaft 36 to the scraper shaft.

The other end of the scraper shaft may be provided with a plug 39 having a stub shaft 120 projecting axially therefrom for engagement with a bearing 21 removably secured to wall 15 by suitable fastening means, such as, by way of example, bolts 23 and nuts 25, Fig. 4.

An aperture having a diameter greater than the outer diameter of the scraper shaft is provided through this end wall for disposing adjacent portions of the inner face of bearing 21 and the free outer end of shaft 20 in abutting relationship whereby to preclude undesirable axial shifting of shaft 20 to the left and for maintaining it in coupled driven relationship with coupling hub 37.

Removal of shaft bearing 21 will permit the scraper shaft to be withdrawn from the machine after the various scraper arm clamps 115 have been first removed therefrom. I have thus provided simple, yet highly effective means for installation and removal of the scraper shaft, thereby making it a simple matter to change from three arm clamps to two or four arm clamps.

The carcass cradle 12 comprises a plurality of laterally spaced elements 38, each of which includes forward or front portions, rear portions, and intermediate portions 40, 42 and 44, respectively. Preferably the forward portions 40 and rear portions 42 are substantially flat, said portions making an acute angle with one another, whereas the intermediate portions 44 are arcuate in form, as clearly illustrated in Fig. 1. The spacing between adjacent cradle elements 38 is of such a dimension as to provide unobstructed access of the dehairing members to a carcass supported on the cradle, it being noted, see Fig. 3, that each set of dehairing members is centered between adjacent cradle elements.

The endmost elements of the cradle are secured to and carried by stub shafts 50 suitably journaled in pillow blocks 52 secured to and carried by the upper edge of support members 10. In the preferred embodiment of the invention the pivotal axis of the cradle is disposed above and to the rear of the axis of rotation of shaft 20 to which the various sets of dehairing arms are mounted.

A cradle actuator lever denoted generally by the numeral 54 is provided at each end of the cradle. The forward end 56 of said levers is secured relative to and adjacent the free outer end of the forward leg portion 40 as at 41 of the cradle assembly, whereas the opposite or rear ends 58 project outwardly beyond the rear face of support member 10 and rearwardly of rear leg portions 42 of the cradle. Each of said levers is secured as at 60 to the rear leg portion of an adjacent cradle element at a location between the free outer end thereof and its pivotal connection with the support member 10.

The rear ends 58 of the actuator levers are interconnected by means of a tie rod 62 which extends through a combination handle and spacer pipe 64.

When the rear ends 58 of actuator levers 54 are in fully elevated position, cradle 12 will be disposed in a lowered operative or scraping position with respect to the dehairing mechanism 14 whereby a carcass, denoted generally by the numeral 70, supported on the cradle will be subjected to the dehairing action of scrapers 22. After the scraping action has been completed, the cradle may be shifted upwardly to a gambreling position (indicated in broken outline in Fig. 1), whereby ends 58 of the actuator levers will be disposed in a lowered position in contact with supporting surface 72. When the cradle is thus shifted to a gambreling position, the carcass will be disposed upon rear leg portions 42, thereby presenting the carcass for processing by a workman standing at the rear of the machine.

Preferably a barrier plate 74 is provided in spanning relationship across the free outer ends of the rear leg portions 42, said barrier plate providing an abutment engageable by the carcass for precluding accidental movement of the carcass off the cradle.

In the preferred embodiment of the invention, an interfering member 78 is secured in spanning relationship across the forward leg portions 40 of the cradle elements wherein rear edge 80 of said member is spaced just forwardly of, or immediately preceding the annular path described by the outer ends of scrapers 22. As clearly illustrated in Fig. 1, interfering member 78 is constructed and arranged in such a manner as to positively support the leg portions of a carcass, thereby precluding the leg portions from passing downwardly into the spacing between adjacent cradle elements 38, in which position the leg portions of the carcass would be subject to breakage and mutilation if forced beneath cradle elements 38 by action of the dehairing mechanism.

With particular reference now to Fig. 1, it will be observed that pivotal connection 59 is disposed above and to the rear of the center line of shaft 20, and that actuator lever 54 is secured relative to rear leg portions 42 of the cradle as at 60, which point of connection is disposed above and to the rear of pivotal connection 59.

From the foregoing, it will be apparent that when a downward force is applied to ends 58 of actuator levers 54, the cradle will be pivoted relative to support unit 10 about pivotal connection 50 and concurrently therewith a lifting force will be applied to the forward ends of forward leg portions 40 and a downward force will be applied to rear leg portions 42 whereby the resultant forces on the cradle will be applied in such a manner as to easily enable one operator to move the cradle from a lowered scraping position to an elevated gambreling position.

It will likewise be observed that when the cradle has been shifted to its fully raised gambreling position, the weight of the carcass will be disposed rearwardly of pivotal point 59, said carcass being fully supported by reason of the contacting relationship which ends 58 of levers 54 make with supporting surface 72.

From the foregoing, it will be observed that the cradle will at all times be disposed on one side or the other of a dead center position and that the cradle can never accidentally or unintentionally be shifted from one position to the other, thereby greatly enhancing the safety characteristics of the device.

The numeral 81 indicates generally a spray pipe from which a suitable stream of water may be sprayed onto the carcass during or after the scraping operation, it being understood that suitable control means, not illustrated, will be provided for enabling an operator to control the operating characteristics of the spraying device.

With reference again to the drawings, it will be observed that a front plate 79 may be provided in spanning relationship with the forward leg portions 56 of cradle elements 38, said plate abutting the forward end of interfering member 78. In this manner the rigidity of the cradle has been greatly enhanced and the connector element extending through the forward ends of the cradle elements is protected.

In conclusion it will be noted that the manner in which the scraper shaft is coupled to and supported by drive shaft 36 of the speed reducer mechanism not only eliminates the need for a bearing, but likewise facilitates close compact coupling of shafts 20 and 36, resulting in a more rigid mounting of the speed reducer mechanism and a pronounced saving of space at the reducer end of the device.

It should be understood that various changes and modifications may be made in the structural details of the device, within the scope of the appended claims, without departing from the spirit of the invention.

What is claimed is:

1. In a carcass dehairing machine, a support having ends and front and rear sides and being open at its top, and a carcass carrying cradle of dimensions adapting it for movement through the open top of the support into and out of a dehairing position, said cradle comprising a plurality of bars extending transversely of the support and spaced laterally from each other, said bars each having front and rear end portions connected by a downwardly bowed arcuate intermediate portion, spacers extending between said bars and holding the bars spaced from each other, pivots projecting outwardly from the endmost of said bars at the junction of their rear portions with rear ends of their arcuate intermediate portions and mounted in bearings on ends of the support and pivotally mounting the cradle for vertical tilting movement from the dehairing position past a dead center to a position in which rear portions of its bars are disposed horizontally and project outwardly from the rear side of the support, and a handle extending transversely of said cradle and having arms secured between front and rear portions of the endmost bars in bridging relation thereto and having portions projecting rearwardly from the cradle constituting props extending downwardly when the cradle is tilted rearwardly and being of a length adapting them to engage a surface upon which said support rests and serve to support the cradle in its rearwardly tilted position.

2. The structure of claim 1 wherein an elongated plate extends along the front portion of the cradle upon and between front end portions of said bars, and a strip extending along the rear side of the cradle and secured against rear ends of the said bars with portions projecting from the bars and constituting an abutment flange serving to prevent an animal from slipping off the rear side of the cradle when the cradle is in its rearwardly tilted position.

References Cited in the file of this patent

UNITED STATES PATENTS

| Number | Name | Date |
| --- | --- | --- |
| 1,600,950 | Schmidt | Sept. 21, 1926 |
| 1,855,361 | Newman | Apr. 26, 1932 |
| 1,865,492 | Wernberg | July 5, 1932 |
| 2,511,116 | Le Fiell | June 13, 1950 |
| 2,517,880 | Ittel | Aug. 8, 1950 |